United States Patent
Huang et al.

(10) Patent No.: US 7,263,241 B2
(45) Date of Patent: Aug. 28, 2007

(54) REGION BASED ILLUMINATION-NORMALIZATION METHOD AND SYSTEM

(75) Inventors: Chingchun Huang, Hsinchu (TW); Yao-Hong Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 842 days.

(21) Appl. No.: 10/742,844

(22) Filed: Dec. 23, 2003

(65) Prior Publication Data

US 2005/0063605 A1 Mar. 24, 2005

(30) Foreign Application Priority Data

Sep. 18, 2003 (TW) .............................. 92125820 A

(51) Int. Cl.
*G06K 9/40* (2006.01)
(52) U.S. Cl. ...................... 382/263; 382/264; 382/274
(58) Field of Classification Search ................ 382/166, 382/260–264, 274
See application file for complete search history.

(56) References Cited

U.S. PATENT DOCUMENTS

| | | | | | |
|---|---|---|---|---|---|
| 4,463,375 | A | * | 7/1984 | Macovski | 378/98.12 |
| 4,827,528 | A | * | 5/1989 | Macovski | 382/263 |
| 6,002,794 | A | * | 12/1999 | Bonneau et al. | 382/166 |
| 6,122,408 | A | * | 9/2000 | Fang et al. | 382/274 |
| 7,167,575 | B1 | * | 1/2007 | Nichani et al. | 382/103 |

* cited by examiner

*Primary Examiner*—Kanjibhai Patel
(74) *Attorney, Agent, or Firm*—Bacon & Thomas, PLLC

(57) ABSTRACT

A region-based illumination-normalization method and system utilizes a plurality of filters to filter a test image for obtaining a high frequency image and a low pass image. The low pass image is segmented into several regions by an image segmentation unit so that a region-based adjustment unit normalizes the regions based on an illumination reference model, respectively. Finally, an image combination unit is employed to combine the high frequency image and the low pass image that is normalized.

16 Claims, 4 Drawing Sheets

REGION BASED ILLUMINATION-NORMALIZATION METHOD AND SYSTEM

BACKGROUND OF THE INVENTION

1. Field of the Invention

The present invention relates to an image process and, more particularly, to a region based illumination-normalization method and system.

2. Description of Corresponding Art

An image has two primary types of image information, illumination information and object information. During an image analysis or an image processing application (such as a face recognition system or a mechanical vision system), the illumination information in the image is usually removed first to eliminate data deviations caused by different lighting effects on objects, thus bringing lighting effects in the processed image to a minimum.

FIG. 1 is a schematic drawing of a face image obtained under different lighting conditions. It illustrates how different lighting can cause different image results. Therefore, in order to utilize a plurality of images in the face recognition system, an illumination compensation process must be performed to the plurality of images to bring the lighting effects to a minimum. Currently, there are two types of illumination compensation processes. One is implemented by utilizing a statistical approach, and the other one is implemented by utilizing a space field analysis process or a frequency field analysis process. These two types of illumination compensation processes will be explained hereinafter.

The statistical approach employs an averaging method to reduce image differences so that the images are presented evenly. The space field analysis process uses a filter to filter image features ($F_0$) and illumination information ($I_0$) from the testing image, and normalizes the illumination information ($I_0$) to serve as illumination information ($I_a$) so that any effect caused by lighting factors are minimized. The illumination information ($I_a$) and the image features ($F_0$) are combined to form an illumination normalized image with low light sensitivity. For example, U.S. Pat. No. 6,122,408 discloses such an image processing method by using a formula:

$$x(x,y) = \alpha(x,y) \cdot Y(x,y) + \beta(x,y),$$

wherein, x (x,y) is an input test image, Y(x,y) is an output illumination normalized image, $\alpha(x,y)$ is a multiplication factor and $\beta(x,y)$ is an addition factor. Accordingly, the output illumination normalized image Y(x,y) can be obtained by:

$$Y(x,y) = (x(x,y) - \beta(x,y))/\alpha(x,y).$$

Thus, this patent focuses on how to obtain the multiplication factor and the addition factor. However, obtaining the multiplication factor and the addition factor is not easy and requires a lot of processing time.

Therefore, it is desirable to provide a region based illumination-normalization method and system to mitigate and/or obviate the aforementioned problems.

SUMMARY OF THE INVENTION

The objective of the present invention is to provide a region based illumination-normalization method and system which can minimize an illumination sensitivity of an image.

In order achieve the above-mentioned objective, the present invention provides a region based illumination-normalization system which includes a high pass filter, a low pass filter, an image normalization unit, and an combination unit. The high pass filter is used for receiving a test image to obtain a high frequency image. The low pass filter is used for receiving the test image to obtain a low frequency image. The image normalization unit is used for receiving the low frequency image and segmenting the low frequency image into a plurality of regions, and then normalizing each region to obtain a normalized low frequency image. The combination unit is used for combining the normalized low frequency image and the high frequency image. Furthermore, the plurality of regions correspond to an illumination reference model with a plurality of reference regions, so as to normalize the regions according to an illumination statistical distribution.

The present invention also provides another region based illumination-normalization system which includes a high pass filter, a low pass filter, an illumination reference model, an image normalization unit, and an image normalization unit. The high pass filter is used for receiving a test image to obtain a high frequency image. The low pass filter is used for receiving the test image to obtain a low frequency image. The image segmentation unit is used for receiving the low frequency image and segmenting the low frequency image into a plurality of regions. The illumination reference model is used for dividing the low frequency image into a plurality of reference regions according to the plurality of regions of the image segmentation unit. The image region normalization unit is used for receiving the plurality of regions and normalizing illumination information of the plurality of regions to obtain a normalized low frequency image via the plurality of reference regions of the illumination reference models. The combination unit is used for combining the normalized low frequency image and the high frequency image.

The present invention also provides a region based illumination-normalization method which includes steps: (A) filtering a test image to obtain a high frequency image and a low frequency image; (B) segmenting the low frequency image to obtain a plurality of regions; (C) normalizing each region to obtain a normalized low frequency image; and (D) combining the normalized low frequency image and the high frequency image. Furthermore, the plurality of regions correspond to an illumination reference model with a plurality of reference regions so as to normalize the regions according to an illumination statistical distribution.

Other objects, advantages, and novel features of the invention will become more apparent from the following detailed description when taken in conjunction with the accompanying drawings.

DETAILED DESCRIPTION OF THE PREFERRED EMBODIMENT

The present invention is a pre-process applicable to many imaging processes, such as face tracking systems, human face recognition system, mechanical vision system, and the like. All these image processing systems need to minimize the effects caused by illumination information, and the present invention can minimize illumination sensitivity for an image. The following embodiment will take a face recognition system for illustrative purposes.

Figure 1:
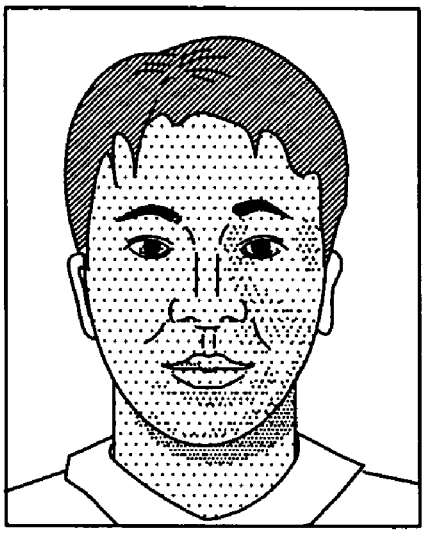
FIG. 1 is a schematic drawing of a face image obtained under different lighting conditions.
Figure 1:
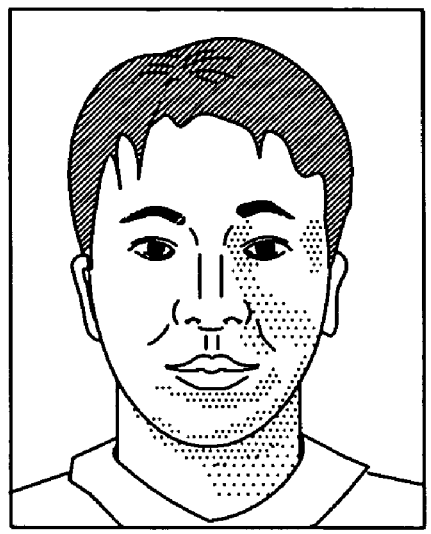
Figure 1:
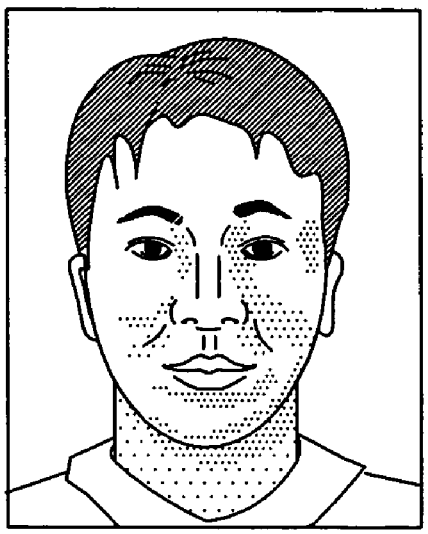
Figure 1:
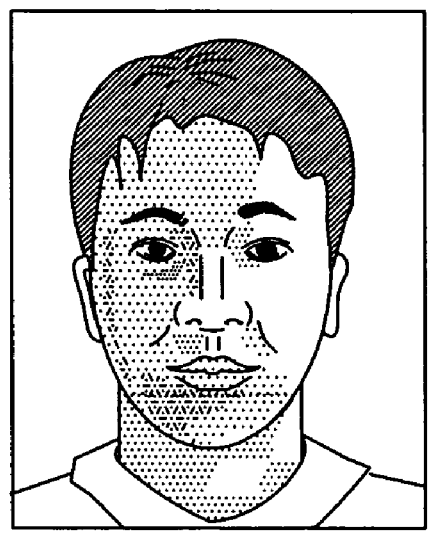
Figure 2:
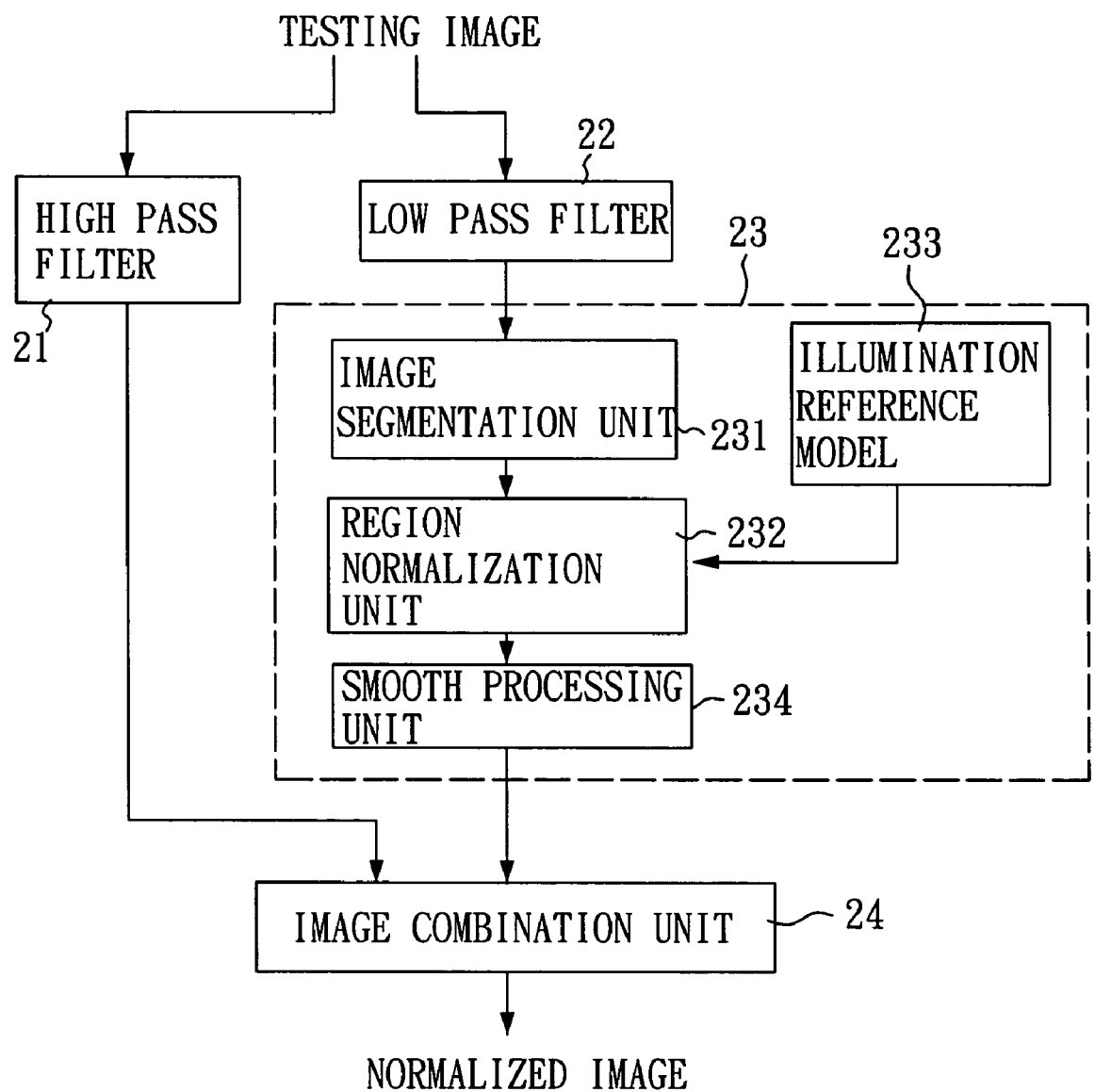
FIG. 2 is a function block schematic drawing of a preferred embodiment in accordance with the present invention.

Please refer to FIG. 2. FIG. 2 is a function block schematic drawing of a preferred embodiment in accordance with the present invention. An illumination-normalization system comprises a high pass filter 21, a low pass filter 22, an image normalization unit 23 and an image combination unit 24. The image normalization unit 23 further has an image segmentation unit 231, a region normalization unit 232, an illumination reference model 233, and a smooth processing unit 234.

The high pass filter 21 and the low pass filter 22 are used for filtering an input testing image (such as a face) to obtain a high frequency image and a low frequency image. The high frequency image is a sharpened image of the original image, which primarily includes most of the image features and some illumination information. The low frequency image is a fuzzy image, which primarily includes most of the illumination information and some image features. Therefore, the present invention will focus only on the low frequency image to minimize the illumination sensitivity of an image. The following description will explain how to use the above-mentioned system to perform an illumination normalization procedure.

Figure 3:
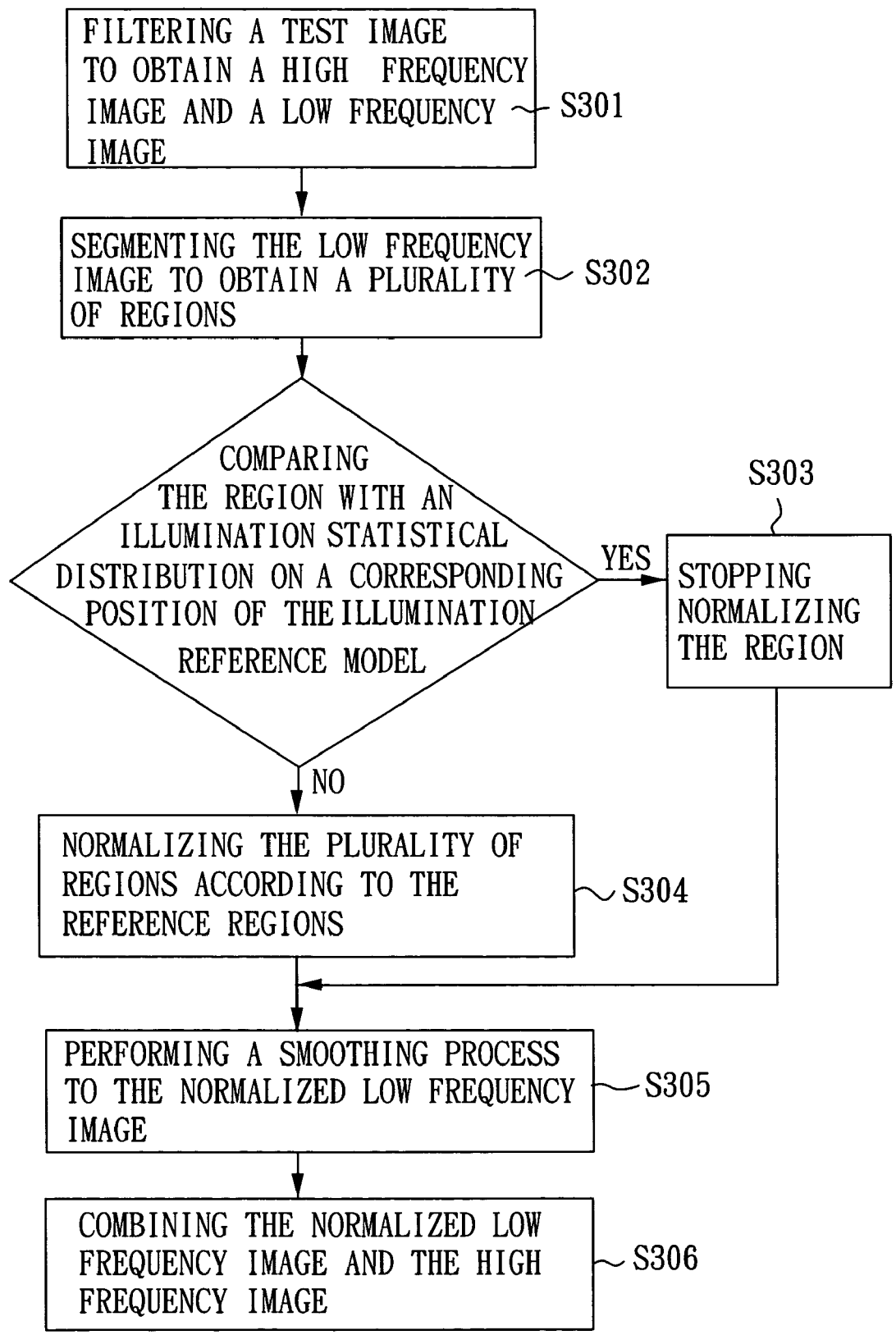
FIG. 3 is a flowchart of the preferred embodiment in accordance with the present invention.
Figure 4:
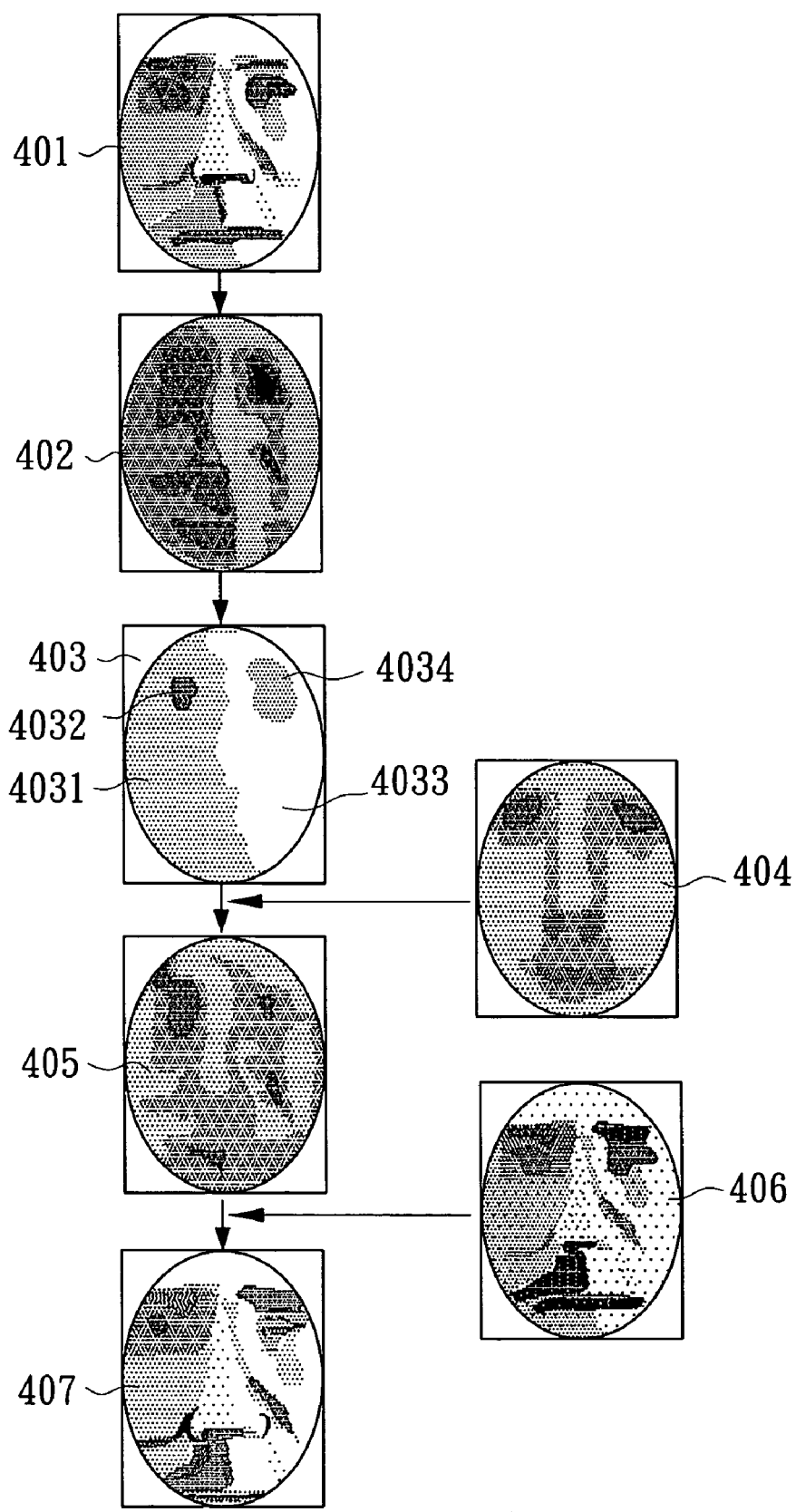
FIG. 4 is an image processing schematic drawing of the preferred embodiment in accordance with the present invention.

Please refer to FIG. 2, FIG. 3 and FIG. 4. FIG. 3 is a flowchart of the preferred embodiment in accordance with the present invention. FIG. 4 is an image processing schematic drawing of the preferred embodiment in accordance with the present invention. First, a test image 401 is inputted separately into the high pass filter 21 and the low pass filter 22, so that the high pass filter 21 outputs a high frequency image 406 with most of the image features, and the low pass filter 22 outputs a low frequency image 402 with most of the illumination information (step 301).

Furthermore, the low frequency image 402 is normalized (step 302), which means reducing the illumination sensitivity of the image by adjusting (compensating) illumination information (light information) of the low frequency image 402. Since the low frequency image 402 has most of the illumination information, change in illumination on the low frequency image 402 is very obvious. The image segmentation unit 231 segments the low frequency image 402 into a plurality of regions 4031, 4032, 4033, 4034 according to an illumination difference to obtain a segmented image 403. The number of regions is determined by a predetermined parameter of the image segmentation unit 231.

Furthermore, the region normalization unit 232 normalizes the illumination information of the plurality of regions 4031, 4032, 4033, 4034 of the segmented image 403. The region normalization unit 232 compares each region 4031, 4032, 4033, 4034 with a corresponding illumination statistical distribution of a corresponding reference region in the illumination reference models 233, 404. For example, the region 4031, located at the left side of the image, is compared with an illumination statistical distribution on a corresponding position at the left side of the illumination reference model 404.

If the regions are identical with the illumination statistical distribution, the region normalization unit 232 stops normalizing the region 4032 (step 303). If the region is different from the illumination statistical distribution, the region normalization unit 232 normalizes the plurality of regions 4031, 4032, 4033, 4034 according to the reference regions (the corresponding position for the plurality of regions 4031, 4032, 4033, 4034) on the illumination reference model 404, so that the plurality of regions 4031, 4032, 4033, 4034 are similar to the illumination reference model 404 and become a normalized low frequency image 405 (step 304). The region normalization unit 232 uses the following formula to achieve a region-based illumination-normalization:

$$T = \hat{G}^{-1} \circ \hat{H},$$

where $\hat{G}$ is a continuous distribution function of the reference region of the illumination reference model 404, and $\hat{H}$ is a continuous distribution function of the plurality of regions 4031, 4032, 4033, 4034. Therefore, a normalized region can be expressed as:

$$R_a''(x,y) = T(R_a(x, y)) = \hat{G}^{-1} \circ \hat{H}(R_a(x,y)),$$

where $R_a''$ is the normalized region, $R_a$ is a test region, and T is a transfer formula.

In this embodiment, the illumination reference model 404 is an object image (such as a face), which combines light information from a plurality of the same type of object images with front face lighting by averaging or weighted averaging of the root-mean square of the light information, in order to divide image features as far as possible and enhance the illumination information. Therefore, a greater number of object images is preferred.

In the aforementioned steps, the low frequency image 402 is segmented, and the plurality of regions 4031, 4032, 4033, 4034 are normalized. However, discontinuities occur at the boundaries among the plurality of regions 4031, 4032, 4033, 4034. Therefore, in step 305, the smoothing unit 234 performs a smoothing process to the normalized low frequency image 405 to eliminate the discontinuities. In addition, step 305 can be preformed after step 303, if the regions are identical with the illumination statistical distribution.

Finally, the image combination unit 24 combines the smoothed low frequency image 402 and the high frequency image 406 to generate a normalized image 407 (step 306).

The normalized image can then be inputted into the face recognition system for a recognition process. According to experimental results, the normalized image provided by the present invention has a high recognition rate of 82.73% in the face recognition system, whereas a non-normalized image has a relatively low recognition rate of 44.93% in the face recognition system. Moreover, an image provided by the prior art light normalization system using the statistical method has a recognition rate of 73.2% in the face recognition system, and an image provided by the technique provided in U.S. Pat. No. 6,122,408 has a recognition rate of 76.6% in the face recognition system. Therefore, the region based illumination-normalization system and method of the present invention can minimize the illumination sensitivity for images, and increase the recognition rate of the face recognition system.

Although the present invention has been explained in relation to its preferred embodiment, it is to be understood that many other possible modifications and variations can be made without departing from the spirit and scope of the invention as hereinafter claimed.

What is claimed is:

1. A region based illumination-normalization system comprising:
   a high pass filter for receiving a test image to obtain a high frequency image;
   a low pass filter for receiving the test image to obtain a low frequency image;
   an image normalization unit for receiving the low frequency image and segmenting the low frequency image into a plurality of regions, and then normalizing each region to obtain a normalized low frequency image; and
   a combination unit for combining the normalized low frequency image and the high frequency image.

2. The region based illumination-normalization system as claimed in claim 1, wherein after the plurality of regions are normalized, the image normalization unit performs a smoothing process on the normalized low frequency image.

3. The region based illumination-normalization system as claimed in claim 1, wherein the plurality of regions correspond to an illumination reference model with a plurality of reference regions, so as to normalize the regions according to an illumination statistical distribution to generate the normalized low frequency image.

4. The region based illumination-normalization system as claimed in claim 1, wherein the plurality of regions correspond to an illumination reference model with a plurality of reference regions, so as to normalize the regions according to an illumination statistical distribution to generate the normalized low frequency image.

5. The region based illumination-normalization system as claimed in claim 3, wherein the illumination reference model is generated from light information in combination with a plurality of object images.

6. The region based illumination-normalization system as claimed in claim 4, wherein the illumination reference model is generated from light information in combination with a plurality of object images.

7. A region based illumination-normalization system comprising:
   a high pass filter for receiving a test image to obtain a high frequency image;
   a low pass filter for receiving the test image to obtain a low frequency image;
   an image segmentation unit for receiving the low frequency image and segmenting the low frequency image into a plurality of regions;
   an illumination reference model for dividing the low frequency image into a plurality of reference regions according to the plurality of regions of the image segmentation unit;
   an image region normalization unit for receiving the plurality of regions and normalizing illumination information of the plurality of regions to obtain a normalized low frequency image via the plurality of reference regions of the illumination reference models; and
   a combination unit for combining the normalized low frequency image and the high frequency image.

8. The region based illumination-normalization system as claimed in claim 7, further comprising a smooth processing unit for receiving the normalized low frequency image, smoothing the normalized low frequency image and then sending the normalized low frequency image to the combination unit.

9. The region based illumination-normalization system as claimed in claim 7, wherein the image region normalization unit compares each region with an illumination statistical distribution of a corresponding reference region to normalize the plurality of regions.

10. The region based illumination-normalization system as claimed in claim 8, wherein the image region normalization unit compares each region with an illumination statistical distribution of a corresponding reference region to normalize the plurality of regions.

11. The region based illumination-normalization system as claimed in claim 7, wherein the illumination reference model is generated by illumination information in combination with a plurality of object images.

12. A region based illumination-normalization method comprising:
   (A) filtering a test image to obtain a high frequency image and a low frequency image;
   (B) segmenting the low frequency image to obtain a plurality of regions;
   (C) normalizing each region to obtain a normalized low frequency image; and
   (D) combining the normalized low frequency image and the high frequency image.

13. The region based illumination-normalization method as claimed in claim 12, wherein after step (C) there is a step (E): performing a smoothing process to the normalized low frequency image.

14. The region based illumination-normalization method as claimed in claim 12, wherein in step (C) the plurality of regions are compared with an illumination statistical distribution of a corresponding reference region for normalization.

15. The region based illumination-normalization method as claimed in claim 13, wherein in step (C) the plurality of regions are compared with an illumination statistical distribution of a corresponding reference region for normalization.

16. The region based illumination-normalization method as claimed in claim 12, wherein in step (C) the illumination reference model is generated from light information in combination with a plurality of object images.

* * * * *